US008163206B2

(12) United States Patent
Chang et al.

(10) Patent No.: US 8,163,206 B2
(45) Date of Patent: Apr. 24, 2012

(54) METHOD FOR MAKING SILICONE HYDROGEL CONTACT LENSES

(75) Inventors: Frank Chang, Suwanee, GA (US); Jürgen Vogt, Flueh (CH); John Dallas Pruitt, Suwanee, GA (US); Xinming Qian, Johns Creek, GA (US); Dawn A. Smith, Duluth, GA (US); Angelika Maria Domschke, Duluth, GA (US); Troy Vernon Holland, Suwanee, GA (US); Richard Charles Turek, Atlanta, GA (US); Daqing Wu, Suwanee, GA (US)

(73) Assignee: Novartis AG, Basel (CH)

( * ) Notice: Subject to any disclaimer, the term of this patent is extended or adjusted under 35 U.S.C. 154(b) by 146 days.

(21) Appl. No.: 12/456,364

(22) Filed: Jun. 16, 2009

(65) Prior Publication Data
US 2010/0258961 A1 Oct. 14, 2010

Related U.S. Application Data

(63) Continuation-in-part of application No. 12/316,993, filed on Dec. 18, 2008.

(60) Provisional application No. 61/212,623, filed on Apr. 14, 2009.

(51) Int. Cl.
B29D 11/00 (2006.01)

(52) U.S. Cl. .................. 264/1.38; 264/1; 264/1.32

(58) Field of Classification Search .................. 264/1.38
See application file for complete search history.

(56) References Cited

U.S. PATENT DOCUMENTS

| | | |
|---|---|---|
| 4,130,706 A | 12/1978 | Plambeck, Jr. ................ 526/245 |
| 4,136,250 A | 1/1979 | Mueller |
| 4,153,641 A | 5/1979 | Deichert |
| 4,182,822 A | 1/1980 | Chang |
| 4,189,546 A | 2/1980 | Deichert |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,276,402 A | 6/1981 | Chromecek |
| 4,312,575 A | 1/1982 | Peyman |
| 4,327,203 A | 4/1982 | Deichert |
| 4,341,889 A | 7/1982 | Deichert |
| 4,343,927 A | 8/1982 | Chang |
| 4,355,147 A | 10/1982 | Deichert |
| 4,486,577 A | 12/1984 | Mueller et al. ................ 525/474 |
| 4,495,313 A * | 1/1985 | Larsen ........................ 523/106 |
| 4,534,916 A | 8/1985 | Wichterle .................... 264/2.1 |
| 4,543,398 A | 9/1985 | Bany |
| 4,547,543 A | 10/1985 | Shibata et al. ................ 524/264 |
| 4,605,712 A | 8/1986 | Mueller et al. ................ 525/474 |
| 4,632,844 A | 12/1986 | Yanagihara |
| 4,661,575 A | 4/1987 | Tom |
| 4,684,538 A | 8/1987 | Klemarczyk ................ 427/54.1 |
| 4,703,097 A | 10/1987 | Wingler |
| 4,711,943 A | 12/1987 | Harvey, III ................ 526/279 |
| 4,826,901 A | 5/1989 | Ittmann et al. ................ 324/145 |
| 4,833,218 A | 5/1989 | Lee ................ 525/455 |
| 4,837,289 A | 6/1989 | Mueller |
| 4,954,586 A | 9/1990 | Toyoshima |
| 4,954,587 A | 9/1990 | Mueller |
| 4,983,332 A | 1/1991 | Hahn et al. ................ 264/1.1 |
| 5,010,141 A | 4/1991 | Mueller ................ 525/276 |
| 5,034,461 A | 7/1991 | Lai |
| 5,039,761 A | 8/1991 | Ono et al. ................ 525/479 |
| 5,070,170 A | 12/1991 | Robertson et al. ................ 528/25 |
| 5,079,319 A | 1/1992 | Mueller ................ 526/238.23 |
| 5,164,462 A | 11/1992 | Yang |
| 5,194,556 A | 3/1993 | Mueller et al. ................ 528/28 |
| 5,224,957 A | 7/1993 | Gasser |
| 5,264,161 A | 11/1993 | Druskis et al. ................ 264/2.6 |
| 5,346,946 A | 9/1994 | Yokoyama |
| 5,352,753 A | 10/1994 | Yang |
| 5,358,995 A | 10/1994 | Lai |
| 5,387,632 A | 2/1995 | Lai |
| 5,416,132 A | 5/1995 | Yokoyama |
| 5,451,617 A | 9/1995 | Lai |
| 5,466,768 A | 11/1995 | Yang |
| 5,480,946 A | 1/1996 | Mueller et al. ................ 525/479 |
| 5,486,579 A | 1/1996 | Lai |
| 5,489,474 A | 2/1996 | Shinoda |
| 5,508,317 A | 4/1996 | Mueller ................ 522/85 |
| 5,527,925 A | 6/1996 | Chabrecek |
| 5,559,163 A | 9/1996 | Dawson |
| 5,563,184 A * | 10/1996 | McGee et al. ................ 523/107 |
| 5,612,389 A | 3/1997 | Chabrecek |
| 5,612,391 A | 3/1997 | Chabrecek |
| 5,621,018 A | 4/1997 | Chabrecek |
| 5,663,288 A | 9/1997 | Shinoda |
| 5,723,512 A | 3/1998 | Leppard |

(Continued)

FOREIGN PATENT DOCUMENTS

WO 96/28762 A1 9/1996

OTHER PUBLICATIONS

PCT International Search Report dated Jan. 28, 2010 for International Application No. PCT/US2009/047428, international filing date Jun. 16, 2009.
PCT Written Opiniion of the International Searching Authority dated Jan. 28, 2010 for International Application No. PCT/US2009/047428, international filing date Jun. 16, 2009.
Winterton et al., "Coulometric Method for Measuring Oxygen Flux and Dk of Contact Lenses and Lens Materials", The Cornea: Transactions of the World Congress on the Cornea III, H. Dwight Cavanagh, Raven Press, Ltd., New York, 1988, pp. 273-280.
PCT International Search Report, Published—Jul. 9, 2009.
PCT Written Opinion of the International Searching Authority, Published—Jun. 22, 2010.

*Primary Examiner* — Yogendra Gupta
*Assistant Examiner* — Amjad Abraham
(74) *Attorney, Agent, or Firm* — Jian Zhou

(57) ABSTRACT

The invention provide a method for making silicone hydrogel based on the Lightstream Technology from a monomer mixture with a curing time of less than about 100 seconds. The present invention is also related to silicone hydrogel contact lenses made according to methods of the invention.

20 Claims, No Drawings

U.S. PATENT DOCUMENTS

| | | | |
|---|---|---|---|
| 5,760,100 A * | 6/1998 | Nicolson et al. | 523/106 |
| 5,767,169 A | 6/1998 | Leppard | |
| 5,789,464 A | 8/1998 | Mueller | 523/108 |
| 5,849,810 A | 12/1998 | Mueller | 522/85 |
| 5,849,811 A | 12/1998 | Nicolson | |
| 5,914,355 A * | 6/1999 | Kunzler | 523/106 |
| 5,962,548 A | 10/1999 | Vanderlaan | |
| 5,965,776 A | 10/1999 | Leppard | |
| 5,981,675 A | 11/1999 | Valint | |
| 5,989,462 A | 11/1999 | Buazza | |
| 6,015,842 A | 1/2000 | LeBoeuf | |
| 6,020,528 A | 2/2000 | Leppard | |
| 6,039,913 A | 3/2000 | Hirt | |
| 6,136,880 A | 10/2000 | Snowwhite | |
| 6,284,813 B1 | 9/2001 | Leppard | |
| 6,359,024 B2 | 3/2002 | Lai | |
| 6,359,025 B1 | 3/2002 | Snowwhite | |
| 6,361,925 B1 | 3/2002 | Leppard | |
| 6,451,871 B1 | 9/2002 | Winterton | |
| 6,465,538 B2 | 10/2002 | Lai | |
| 6,627,124 B1 | 9/2003 | Herbrechtsmeier | |
| 6,719,929 B2 | 4/2004 | Winterton | |
| 6,762,264 B2 | 7/2004 | Künzler | |
| 6,793,973 B2 | 9/2004 | Winterton | |
| 6,800,225 B1 | 10/2004 | Hagmann et al. | 264/1.36 |
| 6,811,805 B2 | 11/2004 | Gilliard | |
| 6,896,926 B2 | 5/2005 | Qiu | |
| 7,091,283 B2 | 8/2006 | Mueller et al. | 525/292 |
| 7,119,210 B2 * | 10/2006 | Schlueter | 548/260 |
| 7,214,809 B2 | 5/2007 | Zanini et al. | 556/419 |
| 7,384,590 B2 | 6/2008 | Kelly et al. | 264/496 |
| 7,387,759 B2 | 6/2008 | Kelly et al. | 264/496 |
| 7,550,519 B2 | 6/2009 | Phelan | |
| 7,553,880 B2 | 6/2009 | Nicolson | |
| 2002/0042022 A1 | 4/2002 | Leppard | |
| 2003/0125498 A1 * | 7/2003 | McCabe et al. | 528/25 |
| 2005/0056954 A1 * | 3/2005 | Devlin et al. | 264/1.32 |
| 2005/0237483 A1 * | 10/2005 | Phelan | 351/162 |
| 2006/0142525 A1 | 6/2006 | Lai | |
| 2006/0252850 A1 | 11/2006 | Jani | |
| 2007/0037897 A1 | 2/2007 | Wang et al. | 523/106 |
| 2007/0105973 A1 | 5/2007 | Nicolson | |
| 2008/0015315 A1 | 1/2008 | Chang | |
| 2008/0143003 A1 | 6/2008 | Phelan | |
| 2008/0143958 A1 | 6/2008 | Medina | |
| 2008/0231798 A1 | 9/2008 | Zhou | |
| 2008/0234457 A1 | 9/2008 | Zhou | |
| 2009/0143499 A1 | 6/2009 | Chang | |
| 2009/0160074 A1 | 6/2009 | Pruitt | |
| 2010/0120938 A1 | 5/2010 | Phelan | |
| 2010/0120939 A1 | 5/2010 | Phelan | |

* cited by examiner

METHOD FOR MAKING SILICONE HYDROGEL CONTACT LENSES

This application claims the benefit under 35 U.S.C. §119 (e) of U.S. provisional application Ser. No. 61/212,623 filed on Apr. 14, 2009, and is continuation-in-part of U.S. patent application Ser. No. 12/316,993 filed on Dec. 18, 2008, herein incorporated by reference in their entirety.

TECHNICAL FIELD OF THE INVENTION

The present invention is related to a method for making silicone hydrogel contact lenses, in particular, under spatial limitation of actinic radiation. In addition, the present invention is related to silicone hydrogel contact lenses made according to the method of invention.

BACKGROUND

In recent years, soft silicone hydrogel contact lenses become more and more popular because of their high oxygen permeability and comfort. However, all commercially available silicone hydrogel contact lenses are produced according to a conventional cast molding technique involving use of disposable plastic molds and a mixture of monomers in the presence or absence of macromers. However, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

Such disadvantages encountered in a conventional cast-molding technique can be overcome by using the so-called Lightstream Technology™ (CIBA Vision), as illustrated in U.S. Pat. Nos. 5,508,317, 5,789,464, 5,849,810, and 6,800,225, which are incorporated by reference in their entireties. The Lightstream Technology™ involves (1) a lens-forming composition which is typically a solution of one or more substantially purified prepolymer with ethylenically unsaturated groups and which generally is substantially free of monomers and crosslinking agents with a small molecular weight, (2) reusable molds produced in high precision, and (3) curing under a spatial limitation of actinic radiation (e.g., UV). Lenses produced according to the Lightstream Technology™ can have high consistency and high fidelity to the original lens design, because of use of reusable, high precision molds. In addition, contact lenses with high quality can be produced at relatively lower cost due to the short curing time and a high production yield.

In order to apply the Lightstream Technology™ in making silicone hydrogel contact lenses, silicone-containing prepolymers have been developed, as described in U.S. Pat. Nos. 7,091,283 and 6,039,913, in U.S. patent application publication Nos. 2008/0015315 A1, 2008/0143958 A1, 2008/0143003 A1, 2008/0231798 A1, and 2008/0234457 A1, and in U.S. patent application Ser. Nos. 12/313,546, 61/114,216 and 61/114,228, which are incorporated by reference in their entireties. However, the Lightstream Technology™ has not been applied to make silicone hydrogel contact lenses from a monomer mixture of a lens-forming material. Therefore, there is still a need for a method for making silicone hydrogel contact lenses from a monomer mixture of lens-forming materials according to the Lightstream Technology™.

SUMMARY OF THE INVENTION

In one aspect, the invention provides a method for producing silicone hydrogel contact lenses. The method comprises the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a monomer mixture of lens-forming materials into the cavity, wherein the monomer mixture comprises at least one hydrophilic amide-type vinylic monomer, at least one siloxane-containing (meth)acrylamide monomer, at least one polysiloxane vinylic monomer or macromer, and from about 0.05% to about 1.5% by weight of a photoinitator, wherein the lens forming material is characterized by having an ability to be cured by a UV light having an UV-intensity of about 4.1 mW/cm$^2$ within about 100 seconds; and irradiating, under a spatial limitation of actinic radiation, the lens-forming material in the mold for a time period of about 120 seconds or less, so as to crosslink the lens-forming material to form the silicone hydrogel contact lens, wherein the produced contact lens comprises an anterior surface defined by the first molding surface, an opposite posterior surface defined by the second molding surface, and a lens edge defined by the spatial limitation of actinic radiation.

In another aspect, the invention provide a lens-forming composition suitable for making silicone hydrogel contact lenses according to a curing method based on a spatial limitation of actinic radiation. The lens-forming composition comprises at least one hydrophilic amide-type vinylic monomer, at least one siloxane-containing acrylate or acrylamide or methacrylamide monomer, at least one polysiloxane vinylic monomer or macromer, and from about 0.05% to about 1.5% by weight of a photoinitator, provided that the total amount of all methacrylate monomer(s) in the lens-forming composition is less than about 10% by weight and is sufficient low so as to provide the lens forming composition with a characteristics of being able to be cured by an UV light having an UV-intensity of about 4.1 mW/cm$^2$ within a time period of less than about 100 seconds.

The invention provides in a further aspect contact lenses obtained according to a method of the invention.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

A "monomer mixture" refers to a composition comprising at least about 20% by weight of one or more vinylic monomers.

"Hydrophilic," as used herein, describes a material or portion thereof that will more readily associate with water than with lipids.

A "vinylic monomer" refers to a low molecular weight compound that has one sole ethylenically unsaturated group. Low molecular weight typically means average molecular weights less than 700 Daltons.

The term "olefinically unsaturated group" or "ethylenicaly unsaturated group" is employed herein in a broad sense and is intended to encompass any groups containing a >C=C<group. Exemplary ethylenically unsaturated groups include without limitation acryloyl, methacryloyl, allyl, vinyl, styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionizing radiation (e.g. gamma ray or X-ray irradiation), microwave irradiation, and the like. Thermal curing or actinic curing methods are well-known to a person skilled in the art.

An "amide-type vinylic monomer" refers to a vinylic monomer comprising one sole ethylenically unsaturated radical of

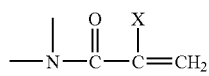

in which X is a covalent bond, hydrogen, or a methyl radical (—CH$_3$).

The term "(meth)acrylamide" refers to acrylamide or methacrylamide.

The term "acrylamide monomer" refers to a vinylic monomer having an ethylenically unsaturated radical of

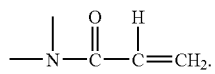

The term "methacrylamide monomer" refers to a vinylic monomer having an ethylenically unsaturated radical of

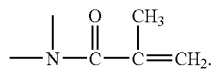

The term "acrylate monomer" refers to a vinylic monomer having an ethylenically unsaturated radical of

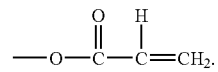

The term "methacrylate monomer" refers to a vinylic monomer having an ethylenically unsaturated radical of

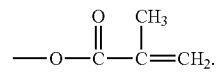

A "polysiloxane-containing vinylic monomer or macromer" refers to a vinylic monomer or macromer containing at least one ehtylenically unsaturated group and a divalent radical of

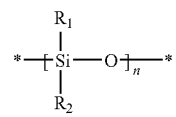

in which $R_1$ and $R_2$ are independently a monovalent $C_1$-$C_{10}$ alkyl, a monovalent $C_1$-$C_{10}$ aminoalkyl, a monovalent of $C_1$-$C_{10}$ hydroxyalkyl, $C_1$-$C_{10}$ ether, $C_1$-$C_{10}$ fluoroalkyl, $C_1$-$C_{10}$ fluoroether or $C_6$-$C_{18}$ aryl radical, -alk-(OCH$_2$CH$_2$)$_m$—OR$_3$, in which alk is $C_1$-$C_6$ alkylene divalent radical, $R_3$ is hydrogen or $C_1$-$C_6$ alkyl, and m is an integer of from 1 to 10; n is an integer of 3 or higher.

The term "fluid" as used herein indicates that a material is capable of flowing like a liquid.

A "hydrophobic vinylic monomer" refers to a vinylic monomer which can be polymerized to form a polymer that is insoluble in water and can absorb less than 10 percent by weight water.

A "vinylic macromer" refers to a medium and high molecular weight compound which comprises one or more ethylenically unsaturated groups. Medium and high molecular weight typically means average molecular weights greater than 700 Daltons.

A "prepolymer" refers to a starting polymer which contains two or more ethylenically unsaturated groups and can be cured (e.g., crosslinked) actinically to obtain a crosslinked polymer having a molecular weight much higher than the starting polymer.

A "silicone-containing prepolymer" refers to a prepolymer which contains silicone.

"Molecular weight" of a polymeric material (including monomeric or macromeric materials), as used herein, refers to the number-average molecular weight unless otherwise specifically noted or unless testing conditions indicate otherwise.

"Polymer" means a material formed by polymerizing one or more monomers.

As used herein, the term "ethylenically functionalized" in reference to a copolymer or a compound is intended to describe that one or more actinically crosslinkable groups have been covalently attached to a copolymer or compound through the pendant or terminal functional groups of the copolymer or the compound according to a coupling process.

As used herein, the term "multiple" refers to three or more.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocur® types, and Irgacure® types, preferably Darocur® 1173, and Irgacure® 2959.

A "polymerizable UV-absorbing agent" refers to a compound comprising an ethylenically-unsaturated group and a UV-absorbing moiety or a latent UV-absorbing moiety.

A "UV-absorbing moiety" refers to an organic functional group which can absorb or screen out UV radiation in the range from 200 nm to 400 nm as understood by a person skilled in the art.

A "polymerizable latent UV-absorbing agent" refers to a compound comprising an ethylencially unsaturated group and a UV-absorbing moiety which has been protected by a labile function group so that its absorption coefficients of UV radiation in the wavelength region from 200 nm to 400 nm are about 50% or less, preferably 70% or less, more preferably about 90% or less of those of the UV-absorbing moiety without the protected labile function group.

The term "labile functional group" means a protective functional group which can be removed (cleaved) from another functional group being protected by the labile functional group.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV radiation is obtained by using a mask or screen having a radiation (e.g., UV) permeable region, a radiation (e.g., UV) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation) having a cross-sectional profile defined by the projection contour of the mask or screen. The projected beam of radiation (e.g., UV radiation) limits radiation (e.g., UV radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV beam (i.e., a spatial limitation of radiation). The radiation used for the crosslinking is a radiation energy, especially UV radiation, gamma radiation, electron radiation or thermal radiation, the radiation energy preferably being in the form of a substantially parallel beam in order on the one hand to achieve good restriction and on the other hand efficient use of the energy.

In the conventional cast-molding process, the first and second molding surface of a mold are pressed against each other to form a circumferential contact line which defines the edge of a result contact lens. Because the close contact of the molding surfaces can damage the optical quality of the molding surfaces, the mold cannot be reused. In contrast, in the Lightstream Technology™, the edge of a resultant contact lens is not defined by the contact of the molding surfaces of a mold, but instead by a spatial limitation of radiation. Without any contact between the molding surfaces of a mold, the mold can be used repeatedly to produce high quality contact lenses with high reproducibility.

"Dye" means a substance that is soluble in a lens-forming fluid material and that is used to impart color. Dyes are typically translucent and absorb but do not scatter light.

A "pigment" means a powdered substance that is suspended in a lens-forming fluid material in which it is insoluble.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (advancing angle measured by Wilhelmy Plate method), which is obtained by averaging measurements of at least 3 individual contact lenses.

An "antimicrobial agent", as used herein, refers to a chemical that is capable of decreasing or eliminating or inhibiting the growth of microorganisms such as that term is known in the art. Preferred examples of antimicrobial agent include without limitation silver salts, silver complexes, silver nanoparticles, silver-containing zeolites, and the likes "Silver nanoparticles" refer to particles which is made essentially of silver metal and have a size of less than 1 micrometer.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3\ oxygen)/(cm^2)(sec)(mm\ Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3\ oxygen)(mm)/(cm^2)(sec)(mm\ Hg)] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm (oxygen transmissibility barrers/mm). In accordance with the invention, a high oxygen permeability in reference to a material or a contact lens characterized by apparent oxygen permeability of at least 40 barrers or larger measured with a sample (film or lens) of 100 microns in thickness according to a coulometric method described in Examples.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D = -n'/(A \times dc/dx)$$

where n'=rate of ion transport [mol/min]; A=area of lens exposed [mm$^2$]; D=Ionoflux Diffusion Coefficient [mm$^2$/min]; dc=concentration difference [mol/L]; dx=thickness of lens [mm].

The Ionoton Ion Permeability Coefficient, P, is then determined in accordance with the following equation:

$$\ln(1-2C(t)/C(0)) = -2APt/Vd$$

where: $C(t)$=concentration of sodium ions at time t in the receiving cell; $C(0)$=initial concentration of sodium ions in donor cell; A=membrane area, i.e., lens area exposed to cells; V=volume of cell compartment (3.0 ml); d=average lens thickness in the area exposed; P=permeability coefficient.

An Ionoflux Diffusion Coefficient, D, of greater than about $1.5 \times 10^{-6}$ mm$^2$/min is preferred, while greater than about $2.6 \times 10^{-6}$ mm$^2$/min is more preferred and greater than about $6.4 \times 10^{-6}$ mm$^2$/min is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

In general, the invention is directed to a method for making silicone hydrogel contact lenses from a monomer mixture based on the Lightstream Technology™. The invention is partly based on the unexpected discovery that by selecting certain classes of vinylic monomers in preparing a monomer mixture for making silicone hydrogel contact lenses, the curing time of the monomer mixture in a mold can be greatly reduced so as to make the monomer mixture suitable for making silicone hydrogel contact lenses based on the Lightstream Technology™. It is believed that a relatively longer curing time may adversely affect the quality of lens edge of contact lenses made according to the Lightstream Technology™ and can increase the product cost by lowering the production output. Although one might be able to shorten the curing time of a monomer mixture by increasing the curing light intensity and/or the concentration of a photoinitiator in the monomer mixture, the high curing light intensity and high photoinitiator concentration have limits and may not be sufficient to reduce the curing time enough for the Lightstream Technology™. Further, these measures may cause resultant lenses with undesirable physical properties, such as, for example, fragile and high content of extractable due to unpolymerized monomers. With a monomer mixture of the invention, the curing time can be substantially reduced, for example, less than 30 seconds at a curing light intensity of about 4.0 mW/cm$^2$. Silicone hydrogel contact lenses made from such monomer mixture according to the Lightstream Technology can have high lens edge quality and relatively low lens production cost because of the relatively short curing time.

The present invention, in one aspect, provides a method for producing silicone hydrogel contact lenses. The method comprises the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a monomer mixture of lens-forming materials into the cavity, wherein the monomer mixture comprises at least one hydrophilic amide-type vinylic monomer, at least one siloxane-containing (meth)acrylamide monomer, at least one polysiloxane vinylic monomer or macromer, and from about 0.05% to about 1.5% by weight of a photoinitator, wherein the lens forming material is characterized by having an ability to be cured by a UV light having a UV-intensity of about 4.1 mW/cm$^2$ within about 100 seconds; and irradiating, under a spatial limitation of actinic radiation, the lens-forming material in the mold for a time period of about 120 seconds or less, so as to crosslink the lens-forming material to form the silicone hydrogel contact lens, wherein the produced contact lens comprises an anterior surface defined by the first molding surface, an opposite posterior surface defined by the second molding surface, and a lens edge defined by the spatial limitation of actinic radiation.

Examples of reusable molds suitable for spatial limitation of radiation include without limitation those disclosed in U.S. Pat. Nos. 6,800,225, 6,627,124, 7,384,590, and 7,387,759, which are incorporated by reference in their entireties.

For example, a preferred reusable mold comprises a first mold half having a first molding surface and a second mold half having a second molding surface. The two mold halves of the preferred reusable mold are not touching each other, but there is a thin gap of annular design arranged between the two mold halves. The gap is connected to the mold cavity formed between the first and second molding surfaces, so that excess monomer mixture can flow into the gap. It is understood that gaps with any design can be used in the invention.

In a preferred embodiment, at least one of the first and second molding surfaces is permeable to a crosslinking radiatione.g., UV radiation). More preferably, one of the first and second molding surfaces is permeable to a crosslinking radiation (e.g., UV radiation) while the other molding surface is poorly permeable to the crosslinking radiation (e.g., UV radiation). For example, one of the mold halves can be made of a UV-permeable material, while the other mold half can be made of a material containing UV absorbing materials, such as, for example carbon black, as described in U.S. Pat. Nos. 7,387,759 and 7,384,590.

The reusable mold preferably comprises a mask which is fixed, constructed or arranged in, at or on the mold half having the radiation-permeable molding surface. The mask is impermeable or at least of poor permeability compared with the permeability of the radiation-permeable molding surface. The mask extends inwardly right up to the mold cavity and surrounds the mold cavity so as to screen all areas behind the mask with the exception of the mold cavity.

Where the curing radiation is UV light, the mask may preferably be a thin chromium layer, which can be produced according to processes as known, for example, in photo and UV lithography. Other metals or metal oxides may also be suitable mask materials. The mask can also be coated with a protective layer, for example of silicon dioxide if the material used for the mould or mould half is quartz.

Alternatively, the mask can be a masking collar made of a material comprising a UV-absorber and substantially blocks curing energy therethrough as described in U.S. Pat. No. 7,387,759 (incorporated by reference in its entirety). In this preferred embodiment, the mold half with the mask comprises a generally circular disc-shaped transmissive portion and a masking collar having an inner diameter adapted to fit in close engagement with the transmissive portion, wherein said transmissive portion is made from an optically clear material and allows passage of curing energy therethrough, and wherein the masking collar is made from a material comprising a UV-blocker and substantially blocks passage of curing energy therethrough, wherein the masking collar generally resembles a washer or a doughnut, with a center hole for receiving the transmissive portion, wherein the transmissive portion is pressed into the center opening of the masking collar and the masking collar is mounted within a bushing sleeve.

Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual molding surfaces, damage as a result of contact is ruled out. This ensures a high service life of the molds, which, in particular, also ensures high reproducibility of the contact lenses to be produced and high fidelity to the lens design.

Any hydrophilic amide-type vinylic monomers can be used in the invention. Examples of hydrophilic amide-type vinylic monomers include without limitation 2-acrylamidoglycolic acid, 2-acrylamido-2-methyl-1-propanesulfonic acid, 2-acrylamido-2-methyl-1-propanesulfonic acid or salt thereof, (3-acrylamidopropyl)trimethylammonium chloride, 3-acryloylamino-1-propanol, N-(butoxymethyl)acrylamide, N-tert-butylacrylamide, diacetone acrylamide, N,N-dimethylacrylamide, N-[3-(dimethylamino)propyl]methacrylamide, N-hydroxyethyl acrylamide, N-(hydroxymethyl)acrylamide, N-(isobutoxymethyl)acrylamide, N-isopropylacrylamide, N-isopropylmethacrylamide, methacrylamide, N-phenylacrylamide, N-[Tris(hydroxymethyl)methyl]acrylamide, N-methyl-3-methylene-2-pyrrolidone, and mixtures thereof. Preferably, the hydrophilic amide-type vinylic monomer is N,N-dimethylacrylamide (DMA), N,N-dimethylmethacrylamide (DMMA), 2-acrylamidoglycolic acid monohydrate, 3-acryloylamino-1-propanol, N-hydroxyethyl acrylamide, N-[Tris(hydroxymethyl)methyl]acrylamide, N-methyl-3-methylene-2-pyrrolidone, and mixtures thereof.

It is found that a siloxane-containing vinylic monomer, especially a vinylic monomer having a tris(trialkylsilyloxy)silylalkyl group (for example, such as, tris(trimethylsilyloxy)-silylpropyl methacrylate (TRIS)), is critical to the elimination of optical defects derived from handling during manufacturing, especially when curing the monomer mixture in a mold within a relatively short time (e.g., less than about 300 seconds) with a UV light. When TRIS is eliminated from a monomer mixture for making silicone hydrogel contact lenses, resultant lenses would develop permanent deformations (optics defects) due to handling. Such deformation or optical defect refers to permanent folding marks observed on the lens by a Contact Lens Optical Quality Analyzer (CLOQA) after the lens is folded manually as described in Example 1. But, when TRIS is present, resultant lenses exhibit a 'healing' effect that eliminated the optical defects (i.e., the folding marks become transient and can disappear after a short time period, e.g., about 15 minutes or less). However, a monomer mixture comprising TRIS have a relatively long curing time. It is found that by replacing TRIS with a (meth)acrylamide having a tris(trimethylsilyloxy)silylalkyl group, the curing of a monomer mixture can be significantly reduced while still eliminating optical defects caused by handling during manufacturing.

Any siloxane-containing (meth)acrylamide monomers can be used in the invention. Preferably, a siloxane-containing (meth)acrylamide monomer is represented by formula (1)

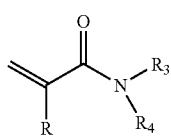

(1)

in which R is H or $CH_3$, $R_3$ and $R_4$ independently of each other are H, $C_1$-$C_6$ alkyl, or a monovalent radical of formula (2)

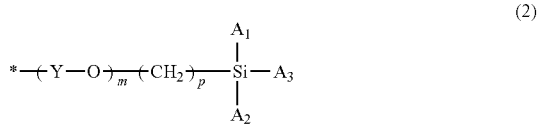

(2)

in which Y is a $C_1$-$C_6$ alkylene divalent radical or a $C_1$-$C_6$ alkylene divalent radical containing one or more hydroxyl groups, m is an integer of 0 to 5, p is an integer of 1 to 6, and $A_1$, $A_2$ and $A_3$ independent of each other are $C_1$-$C_6$ alkyl, phenyl, benzyl, or a radical of formula (3)

(3)

in which $B_1$, $B_2$ and $B_3$ independent of each other are $C_1$-$C_6$ alkyl, phenyl, or benzyl, provided that at least one of $R_3$ and $R_4$ is a radical of formula (2), and provided that at least two of $A_1$, $A_2$ and $A_3$ are radicals of formula (3).

Examples of siloxane-containing (meth)acrylamide monomers of formula (1) include without limitation N-[tris(trimethylsiloxy)silylpropyl]methacrylamide, N-[tris(trimethylsiloxy)-silylpropyl]acrylamide, N-[tris(dimethylpropylsiloxy)silylpropyl]acrylamide, N-[tris(dimethylpropylsiloxy)silylpropyl]methacrylamide, N-[tris(dimethylphenylsiloxy)silylpropyl]acrylamide, N-[tris(dimethylphenylsiloxy)silylpropyl]methacrylamide, N-[tris(dimethylethylsiloxy)silylpropyl]acrylamide, N-[tris(dimethylethylsiloxy)silylpropyl]methacrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl)acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl]acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyidimethylsilyl)propyloxy)propyl]-2-methyl acrylamide; N,N-bis[2-hydroxy-3-(3-(t-butyidimethylsilyl)propyloxy)propyl]acrylamide. Most preferred siloxane-containing (meth)acrylamide monomers of formula (1) are N-[tris(trimethylsiloxy)silylpropyl]acrylamide and N-[2-hydroxy-3-(3-(t-butyldimethylsilyl)propyloxy)propyl]acrylamide.

Any polysiloxane-containing vinylic monomer or macromer" refers to a vinylic monomer or macromer containing at least one ehtylenically unsaturated group and a divalent radical of

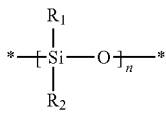

in which $R_1$ and $R_2$ are independently a monovalent $C_1$-$C_{10}$ alkyl, a monovalent $C_1$-$C_{10}$ aminoalkyl, a monovalent of $C_1$-$C_{10}$ hydroxyalkyl, $C_1$-$C_{10}$ ether, $C_1$-$C_{10}$ fluoroalkyl, $C_1$-$C_{10}$ fluoroether or $C_6$-$C_{18}$ aryl radical, -alk-$(OCH_2CH_2)_m$—$OR_3$, in which alk is $C_1$-$C_6$ alkylene divalent radical, $R_3$ is hydrogen or $C_1$-$C_6$ alkyl, and m is an integer of from 1 to 10; n is an integer of 3 or higher. Examples of such vinylic monomers or macromers are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); dimethacrylated or diacrylated polydimethylsiloxanes of various molecular weight; vinyl carbonate-terminated polydimethylsiloxanes; vinyl carbamate-terminated polydimethylsiloxane; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alphaomega-bis-3-aminopropyl-polydimethylsiloxane; polysiloxanylalkyl(meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing vinylic monomers or macromers; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing macromers disclosed in U.S. Pat. Nos. 4,259,467, 4,260,725, and 4,261,875 (herein incorporated by reference in their entireties). Di and triblock macromers consisting of polydimethylsiloxane and polyalkyleneoxides could also be of utility. For example one might use methacrylate end capped polyethyleneoxide-block-polydimethylsiloxane-block-polyethyleneoxide to enhance oxygen permeability. Suitable monofunctional hydroxyl-functionalized siloxane-containing vinylic monomers/macromers and suitable multifunctional hydroxyl-functionalized siloxane-containing vinylic monomers/macromers are commercially available from Gelest, Inc, Morrisville, Pa.

In a preferred embodiment, the monomer mixture comprises a polysiloxane-containing vinylic macromer of formula (4)

  (4)

in which
r is an integer of 0 or 1;
$G_1$ and $G_2$ independent of each other is a linear or branched $C_1$-$C_{10}$ alkylene divalent radical, a divalent radical of —(alk'-O-)$_q$alk- in which q is an integer of from 1 to 5 and alk and alk' independent of each other is a $C_1$-$C_6$ alkylene divalent radical, or a divalent radical of —R'$_1$—X$_4$-E-X$_5$—R'$_2$— in which R'$_1$ and R'$_2$ independent of each other is a linear or branched $C_1$-$C_{10}$ alkylene divalent radical or a divalent radical of —(alk'-O-)$_q$alk- as defined above, $X_4$ and $X_5$ independent of each other are a linkage selected from the group consisting of

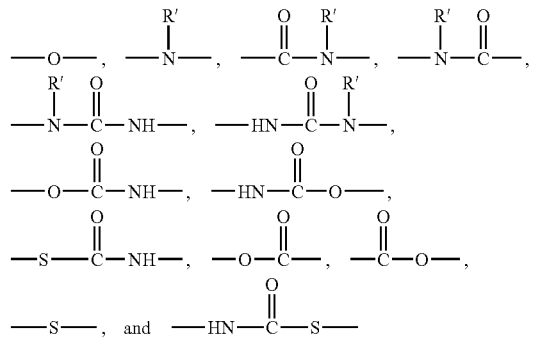

in which R' is H or $C_1$-$C_8$ alkyl, E is an alkyl diradical, a cycloalkyl diradical, an alkylcycloalkyl diradical, an alkylaryl diradical, or an aryl diradical with up to 40 carbon atoms which may have ether, thio, or amine linkages in the main chain;
$X_1$ and $X_2$ independent of each other are a linkage selected from the group consisting of a direct bond,

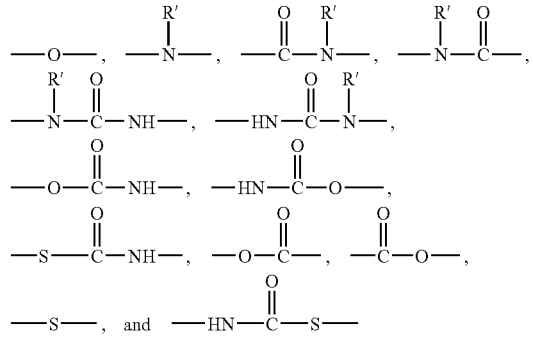

in which R' is H or $C_1$-$C_8$alkyl;
PDMS is a polysiloxane divalent radical of formula (5)

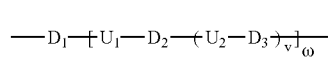  (5)

in which v is 0 or 1, ω is an integer of from 0 to 5, $U_1$ and $U_2$ independent of each other represent a divalent radical of —R'$_1$—X$_4$-E-X$_5$—R'$_2$— as defined above or a divalent radical of —(alk'-O)$_q$-alk- as defined above, $D_1$, $D_2$ and $D_3$ independently of each other are a divalent radical selected from the group consisting of —(CH$_2$CH$_2$O)$_t$—CH$_2$CH$_2$— in which t is an integer of 3 to 40, —CF$_2$—(OCF$_2$)$_a$—(OCF$_2$CF$_2$)$_b$—OCF$_2$— in which a and b independent of each other is an integer of 0 to 10 provided that a+b is a number in the range of 10 to 30, and a divalent group of formula (6)

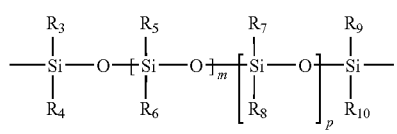
(6)

in which $R_3$, $R_4$, $R_5'$, $R_6$, $R_7$, $R_8$, $R_9$ and $R_{10}$, independently of one another, are $C_1$-$C_8$-alkyl, $C_1$-$C_4$ alkyl- or $C_1$-$C_4$-alkoxy-substituted phenyl, fluoro($C_1$-$C_{18}$-alkyl), cyano ($C_1$-$C_{12}$-alkyl), -alk-(OCH$_2$CH$_2$)$_n$—OR$_{11}$ in which alk is $C_1$-$C_6$-alkylene divalent radical, $R_{11}$ is $C_1$-$C_6$ alkyl and n is an integer from 1 to 10, m and p independently of each other are an integer of from 2 to 698 and (m+p) is from 5 to 700, provided that at least one of $D_1$, $D_2$ and $D_3$ is represented by formula (6); and Q is an organic radical containing an ethylenically unsaturated group.

Preferably, Q is an ethylenically unsaturated group of formula (7)

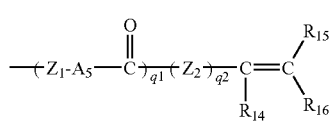
(7)

in which $Z_1$ and $Z_2$ independent of each other are a linear or branched $C_1$-$C_{12}$ alkylene divalent radical, a linear or branched $C_1$-$C_{12}$ alkylene divalent radical having one or more hydroxyl groups, a radical of —(CH$_2$CH$_2$O)$_d$—CH$_2$CH$_2$— in which d is an integer of 1 to 10, unsubstituted phenylene divalent radical, $C_1$-$C_4$ alkyl or $C_1$-$C_4$ alkoxy substituted phenylene divalent radical or $C_7$-$C_{12}$ aralkylene divalent radical; $A_5$ is

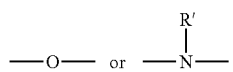

in which R' is H or $C_1$-$C_8$ alkyl; $q_1$ and $q_2$ independent of each other are an integer of 0 or 1; $R_{14}$ is hydrogen, $C_1$-$C_4$ alkyl or halogen; $R_{15}$ and $R_{16}$ independent of each other are hydrogen, $C_1$-$C_4$ alkyl, phenyl, carboxy, halogen, or a radical of

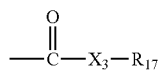

in which $X_3$ is

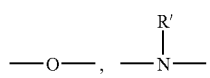

as defined above or —S— and $R_{17}$ is a $C_1$-$C_{12}$ alkyl, hydroxyalkyl, aminoalkyl, alkylaminoalkyl or dialkylaminoalkyl radical.

A polysiloxane-containing vinylic macromer of formula (4) can be prepared according to any known procedures, for example, those described in U.S. Pat. Nos. 4,136,250, 4,486,577, 4,605,712, 5,034,461, 5,416,132, and 5,760,100, herein incorporated by reference in their entireties.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacure types, preferably Darocur 1173®, Irgacure 369®, Irgacure 379®, and Irgacure 2959®. Examples of benzoylphosphine oxide initiators include 2,4,6-trimethylbenzoyldiphenylophosphine oxide (TPO); bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers In accordance with the present invention, the monomer mixture can also comprise additional hydrophilic vinylic monomer other than amid-type vinylic monomer. Nearly any hydrophilic vinylic monomer can be used in the invention. Suitable hydrophilic vinylic monomers are, without this being an exhaustive list, hydroxyl-substituted lower alkyl ($C_1$ to $C_6$) acrylates and methacrylates, hydroxyl-substituted lower alkyl vinyl ethers, N-vinylpyrrole, N-vinyl-2-pyrrolidone, 2-vinyloxazoline, 2-vinyl-4,4'-dialkyloxazolin-5-one, 2- and 4-vinylpyridine, olefinically unsaturated carboxylic acids having a total of 3 to 6 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol, N-vinyl alkylamide, N-vinyl-N-alkylamide, and the like. Among the preferred hydrophilic vinylic monomers are 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, Aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, acrylic acid, a $C_1$-$C_4$-alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, and N-vinyl caprolactam. More preferably, the hydrophilic vinylic monomer other than amide-type vinylic monomer is an acrylate monomer.

A monomer mixture of the invention can also comprises a hydrophobic monomer different from the siloxane-containing vinylic monomer. By incorporating a certain amount of hydrophobic vinylic monomer in a monomer mixture, the mechanical properties (e.g., modulus of elasticity) of the resultant polymer may be improved. Nearly any hydrophobic vinylic monomer can be used in the actinically polymerizable composition for preparing the intermediary copolymer with pendant or terminal functional groups. Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

It is understood that if the hydrophilic vinylic monomer other than amide-type vinylic monomer or hydrophobic vinylic monomer present in the monomer mixture is a methacrylate monomer, the total amount of methacrylate monomers is less than about 10% by weight, preferably, less than about 8% by weight, even more preferably less than about 5% by weight, most preferably less than about 1% by weight. Preferably, their amount is sufficient low so as to provide the lens forming composition with a characteristics of being able to be cured by a UV light having an UV-intensity of about 4.1 mW/cm$^2$ within a time period of less than about 100 seconds.

In accordance with the invention, the UV source can be a Hamamatsu UV lamp manufactured by Hamamatsu K.K. Light from the source is passed down a light guide and through a 330 nm cut-off filter manufactured by Dünnschicht Technik GmbH Germany. The intensity of light that passes through the optical arrangement is preferably measured with a ESE radiometer manufactured by ESE GmbH/Germany.

In a preferred embodiment, the monomer mixture comprises a polymerizable UV-absorbing agent or a polymerizable latent UV-absorbing agent. By having a polymerizable UV-absorbing agent or a polymerizable latent UV-absorbing agent in the monomer mixture, silicone hydrogel lenses with UV-absorbing capability can be obtained. Such lenses may protect to some extent corneal from damages caused by ultraviolet ("UV") radiation.

Any suitable polymerizable UV-absorbing agents can be used in the invention. Preferably, a polymerizable UV-absorbing agent comprises a benzotriazole-moiety or a benzophenone-moiety. Examples of preferred polymerizable UV absorbers include without limitation 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butylphenyl)-5-chlorobenzotriazole, 2-(2'-hydroxy-5'-methacryloxyethylphenyl)benzotriazole, 2-(2'-hydroxy-5'-methacryloxypropylphenyl)benzotriazole, 2-hydroxy-4-acryloxy alkoxy benzophenone, 2-hydroxy4-methacryloxy alkoxy benzophenone, allyl-2-hydroxybenzophenone, 2-hydroxy4-methacryloxy benzophenone.

A polymerizable latent UV-absorbing agent can be prepared from a polymerizable UV-absorbing agent described above according to any known method known to a person skilled in the art. For example, a benzotriazole-moiety or a benzophenone-moiety can be reacted with a protected labile group to convert a UV-absorbing moiety into a latent UV-absorbing moiety.

For a benzotriazole-type of UV-absorbing agent, the hydroxyl radical of the phenol moiety in a benzotriazole moiety can be replaced with a protective labile group to render the agent essentially non-UV absorbing (i.e., the protective group essentially shifts the absorption properties of the compound so that the agent does not absorb as strongly in the 280 to 400 nm range). Examples of protective labile groups include without limitation acetyl radical, acetylalkylsilane, alkylether, and alkylester. These protective groups can be converted back to a hydroxyl radical according to any known method after the lens is cured, thus rendering the lens UV-absorbing. For example, removal of protective labile groups can be performed by soaking the cured lens in saturated bicarbonate solution and heating.

Similarly, at least one hydroxyl radical of the phenolic radical of a benzophenone moiety can be replaced with one of the aforementioned protective labile groups to form a latent UV-absorbing moiety. The latent UV-absorbing moiety can be converted to a UV-absorbing moiety by removing the protective labile group.

A polymerizable UV-absorbing agent or a polymerizable latent UV-absorbing agent is generally is present in the monomer mixture in an amount sufficient to render a contact lens, which is obtained from the curing of the monomer mixture and is subjected to treatment to convert latent UV-absorbing moieties if applicable, absorbing at least about 80 percent of the UV light in the range of from about 280 nm to about 370 nm that impinges on the lens. A person skilled in the art will understand that the specific amount of UV-absorbing agent used in the monomer mixture will depend on the molecular weight of the UV-absorbing agent and its extinction coefficient in the range from about 280 to about 370 nm. In accordance with the invention, the monomer mixture comprises about 0.2% to about 5.0%, preferably about 0.5% to about 2.5%, by weight of a UV-absorbing agent.

Where the monomer mixture comprises a polymerizable UV-absorbing agent, a benzoylphosphine oxide photoinitiator is preferably used as the photoinitiator in the invention. Preferred benzoylphosphine oxide photoinitiators include without limitation 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. It is understood that any photoinitiators other than benzoylphosphine oxide initiators can be used in the invention.

A monomer mixture of the invention can further comprise an antimicrobial agent, preferably antimicrobial metal nanoparticles, more preferably silver nanoparticles.

In accordance with the present invention, a monomer mixture can further comprise various components, such as cross-linking agents, a chain transfer agent, initiator, inhibitors, fillers, visibility tinting agents (e.g., dyes, pigments, or mixtures thereof), a bioactive agent, a leachable lubricant, and the like, as known to a person skilled in the art.

Cross-linking agents are compounds having two or more ethylenically unsaturated groups and having a molecular weight of less than 700 Daltons. Crosslinking agents may be used to improve structural integrity and mechanical strength. Examples of cross-linking agents include without limitation tetra(ethyleneglycol)diacrylate, tri(ethyleneglycol)diacrylate, ethyleneglycol diacylate, di(ethyleneglycol)diacrylate, tetraethyleneglycol dimethacrylate, triethyleneglycol dimethacrylate, ethyleneglycol dimethacylate, di(ethyleneglycol)dimethacrylate, trimethylopropane trimethacrylate, pentaerythritol tetramethacrylate, bisphenol A dimethacrylate, vinyl methacrylate, ethylenediamine dimethyacrylamide, glycerol dimethacrylate, triallyl isocyanurate, triallyl cyanurate, allylmethacrylate, and combinations thereof. A preferred cross-linking agent is tetra(ethyleneglycol) diacrylate, tri(ethyleneglycol)diacrylate, ethyleneglycol diacrylate, di(ethyleneglycol)diacrylate, triallyl isocyanurate, or triallyl cyanurate.

The amount of a cross-linking agent used is expressed in the weight content with respect to the total polymer and is preferably in the range from about 0.05% to about 4%, and more preferably in the range from about 0.1% to about 2%.

Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).
Examples of leachable lubricants include without limitation mucin-like materials (e.g., polyglycolic acid) and non-crosslinkable hydrophilic polymers (i.e., without ethylenically unsaturated groups).

Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The number-average molecular weight $M_n$ of the non-crosslinkable hydrophilic polymer is preferably from 5,000 to 500,000, more preferably from 10,000 to 300,000, even more preferably from 20,000 to 100,000.

In accordance with the invention, a lens-forming material is a composition which can be a solution or a melt at a temperature from about 20° C. to about 85° C. Preferably, a lens-forming material is a solution of all desirable components in water, or an organic solvent, or a mixture of water and one or more organic solvents.

A monomer mixture of the invention can be prepared by dissolving all of the desirable components in any suitable solvent known to a person skilled in the art. Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl 4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

In a preferred embodiment, the monomer mixture of the invention comprises: (1) from about 5% to about 60% by weight, preferably from about 10% to about 50% by weight, even more preferably from about 15% to about 45% by weight, even more preferably from about 20% to about 40% by weight, of a hydrophilic amide-type vinylic monomer; (2) from about 5% to about 50% by weight, preferably from about 10% to about 40% by weight, more preferably from about 15% to about 30% by weight, of a siloxane-containing acrylate or acrylamide or methacrylamide monomer; (3) from about 5% to about 50%, preferably from about 10% to about 40% by weight, more preferably from about 15% to about 35% by weight, of a polysiloxane-containing vinylic macromer; (4) from about 0.05% to about 1.5% by weight, preferably from about 0.1% to 1.3% by weight, more preferably from about 0.5% to about 1.1% by weight, of a photoinitiator; and (5) from 0 to 5% by weight, preferably from about 0.2% to 5% by weight, more preferably from about 0.5% to about 2.5% by weight, of a polymerizable UV-absorbing agent or a polymerizable latent UV-absorbing agent. The foregoing range combinations are presented with the proviso that the listed components and any additional components add up to 100% by weight.

In accordance with the invention, the monomer mixture can be introduced (dispensed) into a cavity formed by a mold according to any known methods.

After the monomer mixture is dispensed into the mold, it is polymerized to produce a contact lens. Crosslinking may be initiated by exposing the monomer mixture in the mold to a spatial limitation of actinic radiation to crosslink the polymerizable components in the monomer mixture. The crosslinking according to the invention may be effected in a very short time, e.g. in ≦ about 120 seconds, preferably in ≦ about 80 seconds, more preferably in ≦50 about seconds, even more preferably in ≦ about 30 seconds, and most preferably in 5 to 30 seconds.

Opening of the mold so that the molded lens can be removed from the mold may take place in a manner known per se.

The molded contact lens can be subject to lens extraction to remove unpolymerized vinylic monomers and macromers. The extraction solvent can be any solvent known to a person skilled in the art. Examples of suitable extraction solvent are those described above for preparing monomer mixtures. After extraction, lenses can be hydrated in a water or an aqueous solution of a wetting agent (e.g., a hydrophilic polymer).

The molded contact lenses can further subject to further processes, such as, for example, surface treatment (for example, such as, plasma treatment, chemical treatments, the grafting of hydrophilic monomers or macromers onto the surface of a lens, Layer-by-layer coating, etc.); packaging in lens packages with a packaging solution which can contain about 0.005% to about 5% by weight of a wetting agent (e.g., a hydrophilic polymer described above) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization; and the like.

Preferred surfaces treatments are LbL coating such as those described in U.S. Pat. Nos. 6,451,871, 6,719,929, 6,793,973, 6,811,805, 6,896,926 (herein incorporated by references in their entirety) and plasma treatment. A preferred plasma treatment is those processes in which an ionized gas is applied to the surface of an article as described in U.S. Pat. Nos. 4,312,575 and 4,632,844 (incorporated herein by reference in their entireties).

A contact lens of the invention has an oxygen permeability of preferably at least about 40 barrers, more preferably at least about 60 barrers, even more preferably at least about 80 barrers. In accordance with the invention, an oxygen permeability is an apparent (directly measured when testing a sample with a thickness of about 100 microns) oxygen permeability according to procedures described in Examples.

A contact lens of the invention has an elastic modulus of about 2.0 MPa or less, preferably about 1.5 MPa or less, more preferably about 1.2 or less, even more preferably from about 0.4 MPa to about 1.0 MPa.

A contact lens of the invention further has an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min.

A contact lens of the invention further has a water content of preferably from about 15% to about 70%, more preferably from about 20% to about 50% by weight when fully hydrated. The water content of a silicone hydrogel contact lens can be measured according to Bulk Technique as disclosed in U.S. Pat. No. 5,849,811, herein incorporated by reference in its entirety.

In another aspect, the invention provide a lens-forming composition suitable for making silicone hydrogel contact lenses according to a curing method based on a spatial limitation of actinic radiation. The lens-forming composition comprises at least one hydrophilic vinylic monomer, at least one siloxane-containing vinylic monomer selected from the group consisting of siloxane-containing acrylate, siloxane-containing acrylamide, siloxane-containing methacrylamide, and a mixture thereof, at least one polysiloxane vinylic monomer or macromer, and from about 0.05% to about 1.5% by weight of a photoinitator, provided that the total amount of all methacrylate monomer(s) in the lens-forming composition is less than about 10% by weight and is sufficient low so as to provide the lens forming composition with a characteristics of being able to be cured by a UV light having an UV-intensity of about 4.1 mW/cm$^2$ within a time period of less than about 100 seconds.

In a preferred embodiment, the siloxane-containing vinylic monomer is a siloxane-containing acrylamide, a siloxane-containing methacrylamide or mixture thereof.

In a more preferred embodiment, the siloxane-containing vinylic monomer is a siloxane-containing acrylamide.

All of the various embodiments of the monomer mixture of the invention described above can be used in this aspect of the invention.

In a further aspect, the invention provides a silicone hydrogel contact lens obtained by the method of the invention.

All of the various embodiments of the molds, monomer mixture, and spatial limitation of radiation, and contact lens of the invention described above can be used in this aspect of the invention.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLE 1

Oxygen Permeability Measurements

The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H.D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters O$_2$/cm$^2$–minute]
$P_{oxygen} = (P_{measured} - P_{water}$ vapor)=(% O$_2$ in air stream) [mm Hg]=partial pressure of oxygen in the air stream
$P_{measured}$=barometric pressure (mm Hg)
$P_{water}$ vapor=0 mm Hg at 34° C. (in a dry cell) (mm Hg)

P_water vapor=40 mm Hg at 34 °C. (in a wet cell) (mm Hg)
t=average thickness of the lens over the exposed test area (mm)

$Dk_{app}$ is expressed in units of barrers.

The oxygen transmissibility (Dk/t) of the material may be calculated by dividing the oxygen permeability ($Dk_{app}$) by the average thickness (t) of the lens.

Ion Permeability Measurements

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm$^2$/minute.

Water Contact Angle (WCA) Measurements

Water contact angle (WCA) measurements are performed by the sessile drop method with a DSA 10 drop shape analysis system from Krüss GmbH, Germany with pure water (Fluka, surface tension 72.5 mN/m at 20° C.). For measurement purposes a contact lens is taken off the storage solution with tweezers and excess storage solution is removed by gentle shaking. The contact lens are placed on the male part of a lens mold and gently blotted with a dry and clean cloth. A water droplet (approximately 1 μl) is then dosed on the lens apex, and the change of the contact angle over time of this water droplet (WCA(t), circle fitting mode) is monitored. The WCA is calculated by the extrapolation of the graph WCA(t) to t=0.

Folding Mark Determination

A Contact Lens Optical Quality Analyzer (CLOQA) is developed to determine optical distortions caused by surface deformations and other defects in the contact lens, based on the principle of the Foucault knife-edge test. A person skilled in the art understands how to select, align and arrange various optics elements to create collimating light, to illuminate a contact lens, and to capture an image with a device (for example, such as, a CCD camera). The test involves illuminating the contact lens with a near-collimated light, placing a Foucault knife edge near the focal point, moving the knife-edge to block off most of the focused light, and capturing the image of contact lens with a device, for example CCD camera behind the Foucault knife edge. Where there is no optical distortion in the contact lens, all light rays passing through the contact lens come to focus at the knife edge and most of the well-focused light will be blocked off. For areas outside the optical zone which has no focusing function, the knife-edge will block the light from half of the lens to make it dark, while the other half appear bright. If the contact lens has no optical distortions in its optical zone, the whole optical zone will be uniformly dark or bright depending on how much light is blocked by the knife-edge. Where there are optical distortions on the contact lens, light passing through such areas in general does not fall into the main focus and may be either blocked by the knife edge (appearing dark) or pass through freely (appearing bright). The level of contrast not only depends on the amplitude of the distortion, but also depends on the fine position of the knife-edge. The defective areas appear as contrast features in the CLOQA image. The knife-edge test with CLOQA is designed as a qualitative testing device for optical distortions in the optical zone.

Folding mark study is carried out as follows. Three autoclaved and/or not autoclaved contact lenses are used in the study. First, images of the contact lenses are taken with the CLOQA. Second, each lens is folded with fingers twice (creating two perpendicular fold lines) and then its image is taken immediately with the CLOQA. Third, the image of each contact lens about 15 minutes after folding is taken with the CLOQA. Three types of CLOQA images are obtained: original one (i.e., without folding), immediately after folding, and about 15 minutes after folding. The folding mark study allows to determine the appearance of the folding line changing over time.

EXAMPLE 2

Preparation of Polysiloxane Vinylic Macromer I with Terminal Acrylamide Groups

In a 4-L beaker, 24.13 g of $Na_2CO_3$ and 80 g of NaCl are dissolved in 1.52 kg of deionized water. In a separate 4-L beaker, 700 g of bis-3-aminopropyl-polydimethylsiloxane (Shin-Etsu, MW ca. 11500) are dissolved in 1000 g of hexane. A 4-L reactor is equipped with overhead stirring with turbine agitator and a 250-mL addition funnel with micro-flow controller. The two solutions are then charged to the reactor, and mixed for 15 minutes with heavy agitation to produce an emulsion. 14.5 g of acryloyl chloride are dissolved in 100 mL of hexane and charged to the addition funnel. The acryloyl chloride solution is added dropwise to the emulsion under heavy agitation over one hour. The emulsion is stirred for 30 minutes on completion of the addition and then agitation is stopped and the phases are allowed to separate overnight. The aqueous phase is decanted and the organic phase is washed twice with a mixture of 2.0 kg of 2.5% NaCl dissolved in water. The organic phase is then dried over magnesium sulfate, filtered to 1.0 μm exclusion, and concentrated on a rotary evaporator. The resulting oil is further purified by high-vacuum drying to constant weight. Analysis of the resulting product by titration reveals 0.175 mEq/g of C=C double bonds.

Preparation of Polysiloxane Vinylic Macromer II with Terminal Acrylamide Groups

In a 4-L beaker, 61.73 g of $Na_2CO_3$ and 80 g of NaCl are dissolved in 1.52 kg of deionized water. In a separate 4-L beaker, 700 g of bis-3-aminopropyl-polydimethylsiloaxane (Shin-Etsu, MW ca. 4500) are dissolved in 1000 g of hexane. A 4-L reactor is equipped with overhead stirring with turbine agitator and a 250-mL addition funnel with micro-flow controller. The two solutions are then charged to the reactor, and mixed for 15 minutes with heavy agitation to produce an emulsion. 36.6 g of acryloyl chloride is dissolved in 100 mL of hexane and charged to the addition funnel. The acryloyl chloride solution is added dropwise to the emulsion under heavy agitation over one hour. The emulsion is stirred for 30 minutes on completion of the addition and then agitation is stopped and the phases are allowed to separate overnight. The aqueous phase is decanted and the organic phase is washed twice with a mixture of 2.0 kg of 2.5% NaCl dissolved in water. The organic phase is then dried over magnesium sulfate, filtered to 1.0 μm exclusion, and concentrated on a rotary evaporator. The resulting oil is further purified by high-vacuum drying to constant weight. Analysis of the resulting product by titration reveals 0.435 mEq/g of C=C double bonds.

Preparation of Polysiloxane Vinylic Macromer III with Terminal Acrylamide Groups In a 4-L beaker, 24.13 g of $Na_2CO_3$ and 80 g of NaCl are dissolved in 1.52 kg of deionized water. In a separate 4-L beaker, 700 g of bis-3-aminopropyl-polydimethylsiloxane (Shin-Etsu, MW ca. 11500) are dissolved in 1000 g of hexane. A 4-L reactor is equipped with overhead stirring with turbine agitator and a 250-mL addition funnel with micro-flow controller. The two solutions are then charged to the reactor, and mixed for 15 minutes with heavy agitation to produce an emulsion. 14.5 g of acryloyl chloride are dissolved in 100 mL of hexane and charged to the addition funnel. The acryloyl chloride solution is added dropwise to the emulsion under heavy agitation over one hour. The emulsion is stirred for 30 minutes on completion of the addition and then agitation is stopped and the phases are allowed to separate overnight. The aqueous phase is decanted and the organic phase is washed twice with a mixture of 2.0 kg of 2.5% NaCl dissolved in water. The organic phase is then dried over magnesium sulfate, filtered to 1.0 µm exclusion, and concentrated on a rotary evaporator. The resulting oil is further purified by high-vacuum drying to constant weight. Analysis of the resulting product by titration reveals 0.175 mEq/g of C.dbd.C double bonds.

Preparation of Polysiloxane Vinylic Macromer IV with Terminal Acrylamide Groups In a 4-L beaker, 61.73 g of $Na_2CO_3$ and 80 g of NaCl are dissolved in 1.52 kg of deionized water. In a separate 4-L beaker, 700 g of bis-3-aminopropyl-polydimethylsiloaxane (Shin-Etsu, MW ca. 4500) are dissolved in 1000 g of hexane. A 4-L reactor is equipped with overhead stirring with turbine agitator and a 250-mL addition funnel with micro-flow controller. The two solutions are then charged to the reactor, and mixed for 15 minutes with heavy agitation to produce an emulsion. 36.6 g of acryloyl chloride is dissolved in 100 mL of hexane and charged to the addition funnel. The acryloyl chloride solution is added dropwise to the emulsion under heavy agitation over one hour. The emulsion is stirred for 30 minutes on completion of the addition and then agitation is stopped and the phases are allowed to separate overnight. The aqueous phase is decanted and the organic phase is washed twice with a mixture of 2.0 kg of 2.5% NaCl dissolved in water. The organic phase is then dried over magnesium sulfate, filtered to 1.0 µm exclusion, and concentrated on a rotary evaporator. The resulting oil is further purified by high-vacuum drying to constant weight. Analysis of the resulting product by titration reveals 0.435 mEq/g of C=C double bonds.

EXAMPLE 3

Preparation of Chain-Extended Polydimethylsiloxane Vinylic Macromer with Terminal Methacrylate Groups (CE-PDMS Macromer)

In the first step, α,ω-bis(2-hydroxyethoxypropyl)-polydimethylsiloxane (Mn=2000, Shin-Etsu, KF-6001a) is capped with isophorone diisocyanate by reacting 49.85 g of α,ω-bis(2-hydroxyethoxypropyl)-polydimethylsiloxane with 11.1 g isophorone diisocyanate (IPDI) in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM.

Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum ($2\times10^{-2}$ mBar). Then, under an atmosphere of dry nitrogen, 320 g of distilled MEK is then added into the reactor and the mixture is stirred thoroughly. 0.235 g of DBTDL are added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. 0.235 g of DBTDL are added, and the reactor is held at 55° C. overnight under a blanket of dry nitrogen. The next day, MEK is removed by flash distillation. The reactor is cooled and 22.7 g of IEM are then charged to the reactor followed by 0.235 g of DBTDL. After 3 hours, an additional 3.3 g of IEM are added and the reaction is allowed to proceed overnight. The following day, the reaction mixture is cooled to 18° C. to obtain CE-PDMS macromer.

EXAMPLE 4

Preparation of Lens Formulations

Three lens formulations are prepared by dissolving, in 1-propanol, CE-PDMS macromer prepared in Example 3 and other components as listed in Table 1.

TABLE 1

| | Compositions (% by weight) | | |
| --- | --- | --- | --- |
| Components | Formulation I | Formulation II | Formulation III |
| CE-PDMS | 33.0 | 33.0 | 33.0 |
| Tris-methacrylate | 17.0 | — | — |
| Tris-methacrylamide | — | 17.0 | — |
| Tris-acrylamide | — | — | 17.0 |
| DMA | 24.0 | 24.0 | 24.0 |
| L-PEG 2000 | 0.5 | 0.5 | 0.5 |
| Darocur 1173 | 1.0 | 1.0 | 1.0 |
| 1-Propanol | 24.5 | 24.5 | 24.5 |

Tris-methacrylate: tris(trimethylsiloxy)silylpropylmethacrylate
Tris-methacrylamide: N-[tris(trimethylsiloxy)silylpropyl]methacrylamide
Tris-acrylamide: N-[tris(trimethylsiloxy)-silylpropyl]acrylamide
DMA: N,N-dimethylacrylamide
L-PEG 2000: N-(carbonyl-methoxypolyethylene glycol-2000)-1,2-disteaoyl-sn-glycero-3-phosphoethanolamin, sodium salt)
DC 1173: Darocur 1173

Studies of Curing Times of the Lens Formulations

UV source is a Hamamatsu UV lamp manufactured by Hamamatsu K.K. Light from the source is passed down a light guide and through a 330 nm cut-off filter manufactured by Dünnschicht Technik GmbH Germany, before being impinged on the sample contained between two quartz microscope slides. The intensity of light that passes through the optical arrangement is measured with a ESE radiometer manufactured by ESE GmbH/Germany.

Table 2 shows a 48% reduction in cure time by replacing Tris methacrylate with Tris methacrylamide and a 78% reduction by replacing Tris methacrylate with Tris acrylamide.

TABLE 2

| Formulation No. | UV-Intensity (mW/cm$^2$) | Irradiation Time (s) | Modulus G' (KPa)* |
|---|---|---|---|
| I | 4.1 | 110.0 | 41.0 |
| II | 4.1 | 57.0 | 80.0 |
| III | 4.0 | 24.0 | 110. |

*G' is the storage modulus and is a measure of the energy stored in a polymer upon deformation. It is measured in the curing solvent

EXAMPLE 5

Lenses are prepared by cast-molding from formulation III prepared in Example 4 in a reusable mold, similar to the mold shown in FIGS. 1-6 in U.S. Pat. Nos.7,384,590 and 7,387,759 (FIGS. 1-6). The mold comprises a female mold half made of CaF$_2$ and a male mold half made of PMMA. The UV irradiation source is a Hamamatsu lamp with the WG335+TM297 cut off filter at an intensity of about 4 mW/cm$^2$. The lens formulation in the mold is irradiated with UV irradition for about 25 seconds. Resultant lenses are extracted with isopropanol, rinsed in water, dipped in a propanol solution of polyacrylic acid, and hydrated in water. The obtained lenses are determined to have the following properties: ion permeability of about 8.0 to about 9.0 relative to Alsacon lens material; apparent Dk (single point) of about 90 to 100; a water content of about 30% to about 33%; and an elastic modulus of about 0.60 MPa to about 0.65 MPa.

EXAMPLE 6

Synthesis of Silicone-Containing Vinylic Macromer with Terminal Methacrylate Groups The macromer is prepared according to the procedures described in U.S. Pat. No. 5,760,100 for preparation Macromer B (Examples B1 to B14).

51.5 g (50 mmol) of the perfluoropolyether Fomblin® ZDOL (from Ausimont S.p.A, Milan) having a mean molecular weight of 1030 g/mol and containing 1.96 meq/g of hydroxyl groups according to end-group titration is introduced into a three-neck flask together with 50 mg of dibutyltin dilaurate. The flask contents are evacuated to about 20 mbar with stirring and subsequently decompressed with argon. This operation is repeated twice. 22.2 g (0.1 mol) of freshly distilled isophorone diisocyanate kept under argon are subsequently added in a counterstream of argon. The temperature in the flask is kept below 30° C. by cooling with a waterbath. After stirring overnight at room temperature, the reaction is complete. Isocyanate titration gives an NCO content of 1.40 meq/g (theory: 1.35 meq/g).

202 9 of the α,ω-hydroxypropyl-terminated polydimethylsiloxane KF-6001 from Shin-Etsu having a mean molecular weight of 2000 g/mol (1.00 meq/g of hydroxyl groups according to titration) are introduced into a flask. The flask contents are evacuated to approx. 0.1 mbar and decompressed with argon. This operation is repeated twice. The degased siloxane is dissolved in 202 ml of freshly distilled toluene kept under argon, and 100 mg of dibutyltin dilaurate (DBTDL) are added. After complete homogenization of the solution, all the perfluoropolyether reacted with isophorone diisocyanate (IPDI) is added under argon. After stirring overnight at room temperature, the reaction is complete. The solvent is stripped off under a high vacuum at room temperature. Microtitration shows 0.36 meq/g of hydroxyl groups (theory 0.37 meq/g).

13.78 g (88.9 mmol) of 2-isocyanatoethyl methacrylate (IEM) are added under argon to 247 g of the α,ω-hydroxypropyl-terminated polysiloxane-perfluoropolyether-polysiloxane three-block copolymer (a three-block copolymer on stoichiometric average, but other block lengths are also present). The mixture is stirred at room temperature for three days. Microtitration then no longer shows any isocyanate groups (detection limit 0.01 meq/g). 0.34 meq/g of methacryl groups are found (theory 0.34 meq/g).

The macromer prepared in this way has two terminal methacrylate groups is completely colourless and clear. It can be stored in air at room temperature in the absence of light for several months without any change in molecular weight.

Preparation of a Lens Forming Material

The siloxane-containing macromer with two terminal methacrylate groups, which is prepared above, is used in preparation of two lens-forming materials. Formulation 1 comprises 25.92% of the siloxane-containing macromer, 19.25% of TRIS (3-tris(trimethyl-siloxy)silylpropyl methacrylate), 28.88% of DMA (N,N-dimethylacrylamide), 24.95% of denatured ethanol, and 1.0% of 2-hydroxy-2-methyl-1-phenyl-1-propanone (Darocure® 1173). Formulation 2 comprises 25.92% of the siloxane-containing macromer, 19.25% of TRIS-Am (N-[tris(trimethylsiloxy)-silylpropyl] acrylamide), 28.88% of DMA, 24.95% of denatured ethanol, and 1.0% of Darocure® 1173.

Preparation of Lenses

Female portions of polypropylene lens molds are filled with about 75 microliters of a lens-forming material prepared as above, and the molds are closed with the male portion of the polypropylene lens molds (base curve molds). Contact lenses are obtained by curing the closed molds for about 2 hours in a UV cure box equipped with Phillips lights (40 watt, F405) with the top light intensity of about 3.61 mW/cm$^2$ and a bottom light intensity of about 3.54 mW/cm$^2$. The oxygen permeability (Dk) and ion permeability (IP) of lenses are measured as described in Example 1. The properties of lenses are reported in Table 3.

TABLE 3

| Formulation No. | H$_2$O (by weight) | Dk | IP | Elongation at break | Elastic Modulus (MPa) |
|---|---|---|---|---|---|
| 1 | 31.5% | 66 | 5.4 | 240% | 0.89 |
| 2 | 35.0% | 49 | 8.1 | 220% | 1.19 |

EXAMPLE 7

Various formulations are prepared by dissolving, in 1-hexanol, CE-PDMS macromer prepared in Example 3, DMA, TRIS-AM, a polymerizable UV-absorbing agent (Norbloc, (2-(2'hydroxy-5'methacryloxyethylphenyl)-2H-benzotriazole)), a photoinitiator, and other components as listed in Table 4. Formulations are examined visually to make sure components are thoroughly mixed. If components do not mix (cloudy etc.), the formulation is heated to 40° C. until formulation becomes clear and mixed. A control formulation is prepared to comprise no Norbloc, 0.5% of Darocur 1173, 33% of CE-PDMS, 17% TRIS-AM, 24% DMA, and 24.5% 1hexanol.

TABLE 4

| Formulation | Norbloc | Initiator | TRIS-Methacrylamide | DMA | 1-hexanol | CE PDMS |
|---|---|---|---|---|---|---|
| 74-1 | 1.28% | 0.99% Irgacure 369 | 16.8% | 23.7% | 24.7% | 32.6% |
| 74-4 | 1.28% | 0.99% Irgacure 379 | 16.8% | 23.7% | 24.7% | 32.6% |
| 74-7 | 1.28% | 0.99% Irgacure OXE01 | 16.8% | 23.7% | 24.7% | 32.6% |
| 86-1* | 1.28% | 0.99% Irgacure 369 | 20.2% | 22.7% | 22.7% | 31.1% |

*the formulation contains 1% L-PEG2000 as a mold release agent.

Photo-rheology data are measured using the Hamamatsu lamp with either the 330 nm, 376 nm, or a stack of 330 and 395 nm high pass cutoff filters placed just before the sample. The intensity is measured by an IL1700 UV-detector with an SED005 sensor for the samples which used the 376 or 395 nm cutoff filter. For the control formulation the intensity is measured using an ESE detector with a 297 nm cutoff filter, then the 330 nm filter is place before the sample for curing the formulation. Examples of cure times measured by photorheology are provided in Table 5.

TABLE 5

| Formulation | Cutoff filter (nm) | Lamp intensity (mW/cm$^2$) | Irradiation Time (s) | G' (kPa) |
|---|---|---|---|---|
| 74-1 | 376 | 17.7 | 75 | 97 |
| 74-4 | 376 | 17.7 | 80 | 90 |
| 74-7 | 376 | 17.7 | 95 | 100 |
| 86-1 | 376 | 17.7 | 90 | 95 |
| 86-1 | 395 | 4.2 | 150 | 93 |
| control | 330 | 4.07 | 82 | 80 |

Lenses from formulation 86-1 are prepared by cast-molding in a reusable mold. The mold comprises a female mold half made of glass and a male mold half made of quartz. The polyacrylic acid, and hydrated in water. The UV/Vis spectrum of a lens is measured in phosphate-buffered saline (PBS). This lens has an average % T in the UVA and UVB range of 3.2 and 0.11, respectively. These values are well within the requirement of <10% Transmittance in the UVA range and <1%Transmittance in the UVB range.

Lens properties are also tested in addition to the above UV/Vis spectrum. The results are shown Table 6.

TABLE 6

| Formulation | Modulus (MPa) | Ave % EtB* | IP | App. Dk | H2O (%) |
|---|---|---|---|---|---|
| 86-1 | 0.51 | 390 | 5.8 +/− 0.7 | 91 +/− 2 | 30.2 |
| control | 0.64 | 240 | 4.1 | 82 | 32.5 |

*EtB = elongation to break

EXAMPLE 8

Various formulations are prepared by dissolving, in 1-propanol, CE-PDMS macromer prepared in Example 3, DMA, TRIS-AM, a polymerizable UV-absorbing agent (Norbloc, (2-(2'hydroxy-5'methacryloxyethylphenyl)-2H-benzotriazole)), a photoinitiator, and other components as listed in Table 7.

TABLE 7

| Formulation | Norbloc | LPEG2000 | Initiator | solvent | TRIS-AM | DMA | CE PDMS | CuP |
|---|---|---|---|---|---|---|---|---|
| 56-2 | 0.79% | 0.5% | 0.99% Irgacure 369 | 23.3% 1-nonanol | 20.3% | 22.8% | 31.3% | — |
| 85-1 | 1.28% | 0.49% | 0.99% TPO | 23.1% 1-propanol | 20.2% | 22.7% | 31.1% | 0.1% |
| 08-1 | 0.99% | 0.5% | 0.99% TPO | 23.3% 1-propanol | 20.3% | 22.8% | 31.2% | 0.1% |

TPO = 2,4,6-trimethylbenzoyldiphenylophosphine oxide;
CuP = copper(II) phthalocyanine UV irradiation source is a Hamamatsu lamp with the WG335+TM297+TM330+TM395 nm cut off filters at an intensity of about 4.2 mW /cm$^2$ as measured by the IL1700 detector. The lens formulation in the mold is irradiated for about 150 seconds. Resultant lenses are extracted with isopropanol, rinsed in water, dipped in a propanol solution of Photo-rheology data are measured using the Hamamatsu lamp with either a 380 nm, or a stack of 330 nm and 388 nm high pass cutoff filters, or a stack of 330 nm and 395 nm high pass cutoff filter placed just before the sample. The intensity is measured by an IL1700 detector using a SED005 sensor from International light. Examples of cure times measured by photorheology are provided in Table 8

TABLE 8

| Formulation | Cutoff filter(s) (nm) | Lamp intensity (mW/cm²) | Irradiation Time (s) | G' (kPa) |
|---|---|---|---|---|
| 56-2 | 330 & 395 | 4 | 48 | 116 |
| 85-1 | 330 & 388 | 6 | 14 | 97 |
| 08-1 | 380 | 19 | 12 | 73 |

Lenses are made from formulation 85-1 using reusable molds described in Example 6. A stack of 330 and 388 nm cutoff filters between the light source and the mold. The formulation is cured for 27 seconds at an intensity of 6.1 mW/cm². The lenses are extracted for 324 seconds in MEK (Methyl ethyl ketone), dipped in 0.1% DMPC (1,2-dimyristoyl-sn-glycero-3-phosphocholine) solutions for a total of 100 seconds, then coated with a polyacrylic acid (PAA) by dipping in a isopropanol solution of PAA (0.1% by weight, pH 2.5) and autoclaved. The UV/Vis spectrum of a lens is measured in phosphate-buffered saline (PBS). This lens has an average % T in the UVA and UVB range of 3.2 and 0.06, respectively. These values are well within the requirement of <10% Transmittance in the UVA range and <1% Transmittance in the UVB range.

Lens properties are also tested in addition to the above UV/Vis spectrum. The results are shown Table 9.

TABLE 9

| Formulation | Modulus (MPa) | Ave % EtB* | IP | App. Dk | H2O (%) |
|---|---|---|---|---|---|
| 85-1 | 0.58 | 330 | 7.0 +/- 0.5 | 92 +/- 15 | 33.0 |

*EtB = elongation to break

What is claimed is:

1. A method for producing silicone hydrogel contact lenses, comprising the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a monomer mixture of lens-forming materials into the cavity, wherein the monomer mixture comprises (1) from about 10% to about 50% by weight of a hydrophilic amide-type vinylic monomer, (2) from about 10% to about 40% by weight of a siloxane-containing (meth)acrylamide monomer, (3) from about 10% to about 40% by weight of a polysiloxane-containing vinylic macromer, (4) from about 0.1% to 1.3% by weight of a photoinitiator, and (5) from 0 to 5% by weight of a polymerizable UV-absorbing agent or a polymerizable latent UV-absorbing agent, wherein if one or more methacrylate monomers are present in the monomer mixture, the total amount of the methacrylate monomers is less than about 5% by weight and the monomer mixture is characterized by having a curing time of less than 100 seconds by a UV light having an UV-intensity of about 4.1 mW/cm2; and irradiating, under a spatial limitation of actinic radiation, the monomer mixture in the mold for a time period of about 80 seconds or less, so as to crosslink the monomer mixture to form the silicone hydrogel contact lens, wherein the produced contact lens comprises an anterior surface defined by the first molding surface, an opposite posterior surface defined by the second molding surface, and a lens edge defined by the spatial limitation of actinic radiation.

2. The method of claim 1, wherein the siloxane-containing (meth)acrylamide monomer is represented by formula (1)

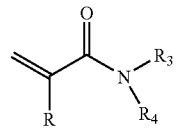

(1)

in which R is H or $CH_3$, $R_3$ and $R_4$ independently of each other are H, $C_1$-$C_6$ alkyl, or a monovalent radical of formula (2)

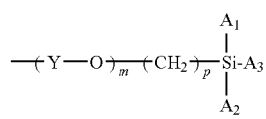

(2)

in which Y is a $C_1$-$C_6$ alkylene divalent radical or a $C_1$-$C_6$ alkylene divalent radical containing one or more hydroxyl groups, m is an integer of 0 to 5, p is an integer of 1 to 6, and $A_1$, $A_2$ and $A_3$ independent of each other are $C_1$-$C_6$ alkyl, phenyl, benzyl, or a radical of formula (3)

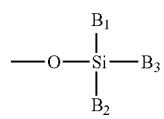

(3)

in which $B_1$, $B_2$ and $B_3$ independent of each other are $C_1$-$C_6$ alkyl, phenyl, or benzyl, provided that at least one of $R_3$ and $R_4$ is a radical of formula (2), and provided that at least two of $A_1$, $A_2$ and $A_3$ are radicals of formula (3).

3. The method of claim 2, wherein the polysiloxane-containing vinylic macromer is represented by formula (4)

$$Q\text{-}X_1\text{-}G_1\text{-}PDMS\text{-}G_2\text{-}(X_2\text{-}Q)_r \qquad (4)$$

in which
  r is an integer of 0 or 1;
  $G_1$ and $G_2$ independent of each other is a linear or branched $C_1$-$C_{10}$ alkylene divalent radical, a divalent radical of $-(alk'\text{-}O)_q$-alk- in which q is an integer of from 1 to 5 and alk and alk' independent of each other is a $C_1$-$C_6$ alkylene divalent radical, or a divalent radical of $-R'_1-X_4-E-X_5-R'_2-$ in which $R'_1$ and $R'_2$ independent of each other is a linear or branched $C_1$-$C_{10}$ alkylene divalent radical or a divalent radical of $-(alk'\text{-}O)_q$-alk- as defined above, $X_4$ and $X_5$ independent of each other are a linkage selected from the group consisting of

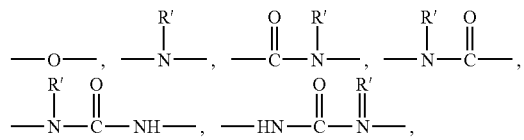

-continued

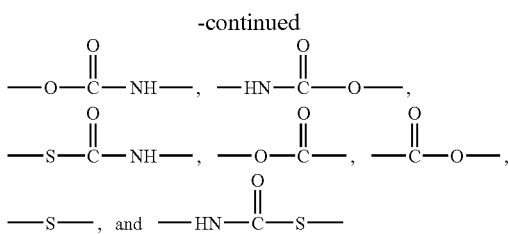

in which R' is H or $C_1$-$C_8$ alkyl, E is an alkyl diradical, a cycloalkyl diradical, an alkylcycloalkyl diradical, an alkylaryl diradical, or an aryl diradical with up to 40 carbon atoms which may have ether, thio, or amine linkages in the main chain;

$X_1$ and $X_2$ independent of each other are a linkage selected from the group consisting of a direct bond,

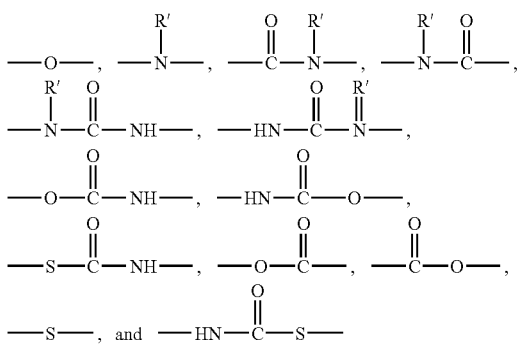

in which R' is H or $C_1$-$C_8$ alkyl;
PDMS is a polysiloxane divalent radical of formula (5)

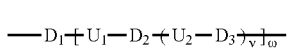
(5)

in which v is 0 or 1, ω is an integer of from 0 to 5, $U_1$ and $U_2$ independent of each other represent a divalent radical of —$R'_1$—$X_4$-E-$X_5$—$R'_2$— as defined above or a divalent radical of —(alk'-O—)$_q$alk- as defined above, $D_1$, $D_2$ and $D_3$ independently of each other are a divalent radical selected from the group consisting of —($CH_2CH_2O$)$_t$—$CH_2CH_2$— in which t is an integer of 3 to 40, —$CF_2$—($OCF_2$)$_a$—($OCF_2CF_2$)$_b$—$OCF_2$— in which a and b independent of each other is an integer of 0 to 10 provided that a+b is a number in the range of 10 to 30, and a divalent group of formula (6)

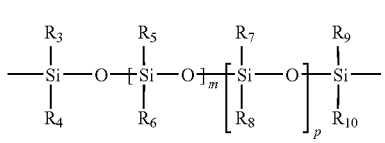
(6)

in which $R_3$, $R_4$, $R_{5'}$, $R_6$, $R_7$, $R_8$, $R_9$ and $R_{10}$, independently of one another, are $C_1$-$C_8$-alkyl, $C_1$-$C_4$ alkyl- or $C_1$-$C_4$-alkoxy-substituted phenyl, fluoro($C_1$-$C_{18}$-alkyl), cyano ($C_1$-$C_{12}$-alkyl), -alk-($OCH_2CH_2$)$_n$—$OR_{11}$ in which alk is $C_1$-$C_6$-alkylene divalent radical, $R_{11}$ is $C_1$-$C_6$ alkyl and n is an integer from 1 to 10, m and p independently of each other are an integer of from 2 to 698 and (m+p) is from 5 to 700, provided that at least one of $D_1$, $D_2$ and $D_3$ is represented by formula (6); and Q is an ethylenically unsaturated group of formula (7)

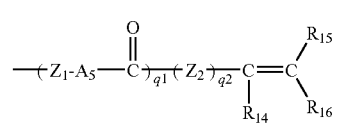
(7)

in which $Z_1$ and $Z_2$ independent of each other are a linear or branched $C_1$-$C_{12}$ alkylene divalent radical, a linear or branched $C_1$-$C_{12}$ alkylene divalent radical having one or more hydroxyl groups, a radical of —($CH_2CH_2O$)$_d$—$CH_2CH_2$ in which d is an integer of 1 to 10, unsubstituted phenylene divalent radical, $C_1$-$C_4$ alkyl or $C_1$-$C_4$ alkoxy substituted phenylene divalent radical or $C_7$-$C_{12}$ aralkylene divalent radical; $A_5$ is

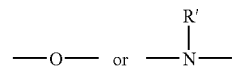

in which R' is H or $C_1$-$C_8$ alkyl; $q_1$ and $q_2$ independent of each other are an integer of 0 or 1; $R_{14}$ is hydrogen, $C_1$-$C_4$ alkyl or halogen; $R_{15}$ and $R_{16}$ independent of each other are hydrogen, $C_1$-$C_4$ alkyl, phenyl, carboxy, halogen, or a radical of

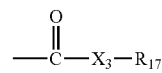

in which $X_3$ is

as defined above or —S— and $R_{17}$ is a $C_1$-$C_{12}$ alkyl, hydroxyalkyl, aminoalkyl, alkylaminoalkyl or dialkylaminoalkyl radical.

4. The method of claim 2, wherein the hydrophilic amide-type vinylic monomer is selected from the group consisting of 2-acrylamidoglycolic acid, 2-acrylamido-2-methyl-1-propanesulfonic acid, 2-acrylamido-2-methyl-1-propanesulfonic acid or salt thereof, (3-acrylamidopropyl)trimethylammonium chloride, 3-acryloylamino-1-propanol, N-(butoxymethyl)acrylamide, N-tert-butylacrylamide, diacetone acrylamide, N,N-dimethylacrylamide, N,N-dimethylmethacrylamide, N-[3-(dimethylamino)propyl]methacrylamide, N-hydroxyethyl acrylamide, N-(hydroxymethyl)acrylamide, N-(isobutoxymethyl)acrylamide, N-isopropylacrylamide, N-isopropylmethacrylamide, methacrylamide, N-phenylacrylamide, N-[Tris(hydroxymethyl)methyl]acrylamide, N-methyl-3-methylene-2-pyrrolidone, and a mixture thereof.

5. The method of claim 3, wherein the siloxane-containing (meth)acrylamide monomer is selected from the group consisting of N-[tris(trimethylsiloxy)silylpropyl]methacrylamide, N-[tris(trimethylsiloxy)-silylpropyl]acrylamide, N-[tris(dimethylpropylsiloxy)silylpropyl]acrylamide, N-[tris(dimethylpropylsiloxy)silylpropyl]methacrylamide, N-[tris(dimethyl-phenylsiloxy)silylpropyl]acrylamide, N-[tris(dimethylphenylsiloxy)silylpropyl]methacrylamide, N-[tris(dimethylethylsiloxy) silylpropyl]acrylamide, N-[tris (dimethylethylsiloxy)silylpropyl] methacrylamide, N-(2-hydroxy-3-(3-(bis(trimethylsilyloxy)methylsily)ppropyloxy) propyl)-2- methyl acrylamide; N-(2-hydroxy-3-(3-(bis (trimethylsilyloxy)methylsilyl)propyloxy)propyl) acrylamide; N,N-bis[2-hydroxy-3-(3-(bis(trimethylsilyloxy) methylsilyl)propyloxy)propyl]-2-methyl acrylamide;

N, N-bis[2-hydroxy-3-(3(bis(trimethylsilyloxy)methylsilyl)propyloxy)propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N, N-bis[2-hydroxy-3-(3-(tris(trimethylsilyloxy)silyl) propyloxy)propyl]-2-methyl acrylamide; N,N-bis[2-hydroxy-3-(3-(tris(trimethylsilyloxy)silyl)propyloxy) propyl]acrylamide; N-[2-hydroxy-3-(3-(t-butyldimethylsilyl)propyloxy)propyl]-2-methyl acrylamide; N42-hydroxy-3-(3-(t-butyldimethylsilyl) propyloxy)propyl]acrylamide; N,N-bis[2-hydroxy-3-(3-(t-butyldimethylsilyl)propyloxy)propyl]-2-methyl acrylamide; N, N-bis[2-hydroxy-3-(3-(t-butyldimethylsilyl)propyloxy)propyl]acrylamide.

6. The method of claim 3, wherein the polysiloxane-containing vinylic macromer is represented by formula (4) in which $D_1$, $D_2$ and $D_3$ independently of each other are a divalent radical of formula (6).

7. The method of claim 3, wherein the monomer mixture comprises a polymerizable UV-absorbing agent or a polymerizable latent UV-absorbing agent in an amount from about 0.2% to about 5.0% by weight.

8. The method of claim 7, wherein the monomer mixture comprises a polymerizable UV-absorbing agent which comprises a benzotriazole- and/or benzophenone-moiety.

9. The method of claim 8, wherein the photoinitiator is a benzoylphosphine oxide photoinitiator.

10. The method of claim 7, wherein the monomer mixture comprises a polymerizable latent UV-absorbing agent.

11. The method of claim 3, wherein at least one of the first and second molding surfaces is permeable to UV radiation and optionally the other molding surface is poorly permeable to UV radiation.

12. The method of claim 11, wherein the mold is a reusable mold comprising a mask which is fixed, constructed or arranged in, at or on the mold half having the radiation-permeable molding surface, wherein the mask is UV-impermeable or at least of poor UV-permeability compared with the UV-permeable molding surface, wherein the mask extends inwardly right up to the mold cavity and surrounds the mold cavity so as to screen all areas behind the mask with the exception of the mold cavity.

13. The method of claim 12, wherein the monomer mixture in the mold is irradiated under the spatial limitation of actinic radiation for a time period of about 50 seconds or less.

14. The method of claim 2, wherein the monomer mixture comprises (1) from about 15% to about 45% by weight of the hydrophilic amide-type vinylic monomer; (2) from about 15% to about 30% by weight of the siloxane-containing acrylate or acrylamide or methacrylamide monomer; (3) from about 15% to about 35% by weight of the polysiloxane-containing vinylic macromer; (4) from about 0.1% to 1.3% by weight of a photoinitiator; and (5) from 0 to 5% by weight of a polymerizable UV-absorbing agent or a polymerizable latent UV-absorbing agent, provided that components (1) to (5) and any additional components add up to 100% by weight.

15. A method for producing silicone hydrogel contact lenses, comprising the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a monomer mixture of lens-forming materials into the cavity, wherein the monomer mixture comprises (1) from about 10% to about 50% by weight of a hydrophilic amide-type vinylic monomer, (2) from about 10% to about 40% by weight of a siloxane-containing acrylate, (3) from about 10% to about 40% by weight of a polysiloxane-containing vinylic macromer, (4) from about 0.1% to 1.3% by weight, more preferably from about 0.5% to about 1.1% by weight, of a photoinitiator, and (5) from 0 to 5% by weight of a polymerizable UV-absorbing agent or a polymerizable latent UV-absorbing agent, wherein if one or more methacrylate monomers are present in the monomer mixture~the total amount of the methacrylate monomers is less than about 5% by weight and the monomer mixture is characterized by having a curing time of less than about 100 seconds by a UV light having an UV-intensity of about 4.1 mW/cm2 within a time period of less than about 100 seconds; and irradiating, under a spatial limitation of actinic radiation, the monomer mixture in the mold for a time period of about 80 seconds or less, so as to crosslink the monomer mixture to form the silicone hydrogel contact lens, wherein the produced contact lens comprises an anterior surface defined by the first molding surface, an opposite posterior surface defined by the second molding surface, and a lens edge defined by the spatial limitation of actinic radiation.

16. The method of claim 5, wherein the hydrophilic amide-type vinylic monomer is selected from the group consisting of 2-acrylamidoglycolic acid, 2-acrylamido-2-methyl-1-propanesulfonic acid, 2-acrylamido-2-methyl-1-propanesulfonic acid or salt thereof, (3-acrylamidopropyl)trimethylammonium chloride, 3-acryloylamino-1-propanol, N-(butoxymethyl)acrylamide, N-tert-butylacrylamide, diacetone acrylamide, N,N-dimethylacrylamide, N,N-dimethylmethacrylamide, N-[3-(dimethylamino)propyl]methacrylamide, N-hydroxyethyl acrylamide, N-(hydroxymethyl) acrylamide, N-(isobutoxymethyl)acrylamide, N-isopropylacrylamide, N-isopropylmethacrylamide, methacrylamide, N-phenylacrylamide, N-[Tris(hydroxymethyl) methyl]acrylamide, N-methyl-3-methylene-2-pyrrolidone, and a mixture thereof.

17. The method of claim 6, wherein the polysiloxane-containing vinylic macromer is represented by formula (4) in which $D_1$, $D_2$ and $D_3$ independently of each other are a divalent radical of formula (6) and r, vand ω are an integer of 1, wherein the hydrophilic amide-type vinylic monomer is selected from the group consisting of 2-acrylamidoglycolic acid, (3-acrylamidopropyl) trimethylammonium chloride, 3-acryloylamino-1-propanol, N,N-dimethylacrylamide, N,N-dimethylmethacrylamide, N-hydroxyethyl acrylamide, N-(hydroxymethyl) acrylamide, N-[Tris(hydroxymethyl) methyl]acrylamide, N-methyl-3-methylene-2-pyrrolidone, and a mixture thereof, wherein the siloxane-containing (meth)acrylamide monomer is selected from the group consisting of N-[tris(trimethylsiloxy)silylpropyl]methacrylamide, N-[tris(trimethylsiloxy)-silylpropyl]acrylamide, N[tris (dimethylpropylsiloxy)silylpropyl]acrylamide, N-[tris (dimethylpropylsiloxy)-silylpropyl]methacrylamide, N-[tris (dimethylethylsiloxy) silylpropyl]acrylamide, N-[tris(dimethylethylsiloxy)silylpropyl]methacrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy) propyl]acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl) acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N[2-hydroxy-3-(3-(t-butyldimethylsilyl)propyloxy)propyl]-2-methyl acrylamide; N[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide, and mixture thereof.

18. The method of claim 17, wherein the hydrophilic amide-type vinylic monomer is selected from the group consisting of N,N-dimethylacrylamide, N,N-dimethylmethacrylamide, N-hydroxyethyl acrylamide, N-(hydroxymethyl)acrylamide, and mixture thereof, wherein the siloxane-containing (meth)acrylamide monomer is selected from the group consisting of N-[tris(trimethylsiloxy)silylpropyl]methacrylamide, N-[tris(trimethylsiloxy)-silylpropyl]acrylamide, N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide, and mixture thereof.

19. The method of claim 18, wherein the monomer mixture comprises a polymerizable UV-absorbing agent which comprises a benzotriazole- and/or benzophenone-moiety.

20. The method of claim 14, wherein the polysiloxane-containing vinylic macromer is represented by formula (4) in which $D_1$, $D_2$ and $D_3$ independently of each other are a divalent radical of formula (6) and r, v and ω are an integer of 1, wherein the hydrophilic amide-type vinylic monomer is selected from the group consisting of 2-acrylamidoglycolic acid, (3-acrylamidopropyl) trimethylammonium chloride, 3-acryloylamino-1-propanol, N,N-dimethylacrylamide, N,N-dimethylmethacrylamide, N-hydroxyethyl acrylamide, N-(hydroxymethyl)acrylamide, N-[Tris(hydroxymethyl)methyl]acrylamide, N-methyl-3-methylene-2-pyrrolidone, and a mixture thereof, wherein the siloxane-containing (meth)acrylamide monomer is selected from the group consisting of N-[tris(trimethylsiloxy)silylpropyl]methacrylamide, N-[tris(trimethylsiloxy)-silylpropyl]acrylamide, N4tris(dimethylpropylsiloxy)silylpropyl]acrylamide, N-[tris(dimethylpropylsiloxy)silylpropyl]methacrylamide, N-[tris(dimethylethylsiloxy) silylpropyl]acrylamide, N-[tris(dimethylethylsiloxy)silylpropyl]methacrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy) propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl) acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N[2-hydroxy-3-(3-(t-butyldimethylsilyl)propyloxy)propyl]-2-methyl acrylamide; N[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide.

* * * * *